(12) United States Patent
Wilens et al.

(10) Patent No.: US 9,316,729 B2
(45) Date of Patent: Apr. 19, 2016

(54) SYSTEMS AND METHODS FOR PROVIDING TRIGGER TIMING

(75) Inventors: David Wilens, Oak Hill, VA (US); Mark Hibbard, Arlington, VA (US); William Cummings, Charlottesville, VA (US)

(73) Assignee: NIITEK, Inc., Dulles, VA (US)

( * ) Notice: Subject to any disclaimer, the term of this patent is extended or adjusted under 35 U.S.C. 154(b) by 0 days.

(21) Appl. No.: 11/754,136

(22) Filed: May 25, 2007

(65) Prior Publication Data

US 2008/0291080 A1 Nov. 27, 2008

(51) Int. Cl.
*G01S 13/22* (2006.01)
*G01S 7/02* (2006.01)
*G01S 7/28* (2006.01)
G01S 7/36 (2006.01)
G01S 13/02 (2006.01)
G01S 13/88 (2006.01)

(52) U.S. Cl.
CPC ............. *G01S 13/222* (2013.01); *G01S 7/023* (2013.01); *G01S 7/28* (2013.01); G01S 7/36 (2013.01); G01S 13/0209 (2013.01); G01S 13/885 (2013.01)

(58) Field of Classification Search
CPC ..... G01S 13/222; G01S 13/22; G01S 13/885; G01S 7/28; G01S 7/36; G01S 7/023; G01S 13/0209
USPC ............... 327/261–290; 380/46, 35; 342/137; 708/250–256; 333/18
See application file for complete search history.

(56) References Cited

U.S. PATENT DOCUMENTS

| | | |
|---|---|---|
| 3,639,784 A | 2/1972 | Kelleher, Jr. |
| 4,070,673 A | 1/1978 | Schmidt et al. |
| 4,438,404 A | 3/1984 | Philipp |
| 4,439,765 A | 3/1984 | Wilmot |
| 4,581,715 A | 4/1986 | Hyatt |
| 4,590,614 A | 5/1986 | Erat |
| 4,591,858 A | 5/1986 | Jacobson |
| 4,678,345 A | 7/1987 | Agoston |
| 4,686,655 A | 8/1987 | Hyatt |
| 4,715,000 A | 12/1987 | Premerlani |
| 4,760,525 A | 7/1988 | Webb |
| 4,833,475 A | 5/1989 | Pease et al. |
| 5,003,562 A | 3/1991 | van Driest et al. |
| 5,053,983 A | 10/1991 | Hyatt |
| 5,115,245 A | 5/1992 | Wen et al. |

(Continued)

FOREIGN PATENT DOCUMENTS

| | | | |
|---|---|---|---|
| CA | 2266222 | * | 9/1999 |
| EP | 615137 A2 | | 9/1994 |

OTHER PUBLICATIONS

Wikipedia, the free encyclopedia, "Field-Programmable Gate Array", Internet Brief, "http://en.wikipedia.org/wiki/FPGA", search date Sep. 27, 2006, 7 ppgs.

(Continued)

*Primary Examiner* — Cassie Galt
(74) *Attorney, Agent, or Firm* — Finnegan, Henderson, Farabow, Garrett & Dunner, LLP

(57) ABSTRACT

A system for providing signal trigger pulses comprises an equivalent time sampling unit providing transmit and receive trigger pairs, and a control unit controlling the equivalent time sampling unit to provide pseudorandom delay length variations between the trigger pairs.

27 Claims, 5 Drawing Sheets

(56) References Cited

U.S. PATENT DOCUMENTS

| | | | |
|---|---|---|---|
| 5,192,886 A | 3/1993 | Wetlaufer | |
| 5,243,343 A | 9/1993 | Moriyasu | |
| 5,315,627 A | 5/1994 | Draving | |
| 5,351,055 A | 9/1994 | Fujikawa et al. | |
| 5,386,215 A | 1/1995 | Brown | |
| 5,396,065 A * | 3/1995 | Myerholtz et al. | 250/287 |
| 5,396,658 A | 3/1995 | Hwu et al. | |
| 5,420,531 A | 5/1995 | Wetlaufer | |
| 5,420,589 A | 5/1995 | Wells et al. | |
| 5,424,735 A | 6/1995 | Arkas et al. | |
| 5,444,459 A | 8/1995 | Moriyasu | |
| 5,451,894 A | 9/1995 | Guo | |
| 5,469,176 A | 11/1995 | Sandler et al. | |
| 5,495,260 A | 2/1996 | Couture | |
| 5,510,800 A | 4/1996 | McEwan | |
| 5,523,760 A | 6/1996 | McEwan | |
| 5,552,793 A | 9/1996 | McLeod et al. | |
| 5,661,490 A | 8/1997 | McEwan | |
| 5,748,153 A | 5/1998 | McKinzie, III et al. | |
| 5,805,110 A | 9/1998 | McEwan | |
| 5,847,677 A * | 12/1998 | McCorkle | 342/204 |
| 5,900,761 A | 5/1999 | Hideno et al. | |
| 5,900,833 A | 5/1999 | Sunlin et al. | |
| 5,939,912 A | 8/1999 | Rehm | |
| 5,969,667 A | 10/1999 | Farmer et al. | |
| 5,986,600 A | 11/1999 | McEwan | |
| 6,002,723 A | 12/1999 | Chethik | |
| 6,055,287 A | 4/2000 | McEwan | |
| 6,137,433 A | 10/2000 | Zavorotny et al. | |
| 6,150,863 A | 11/2000 | Conn et al. | |
| 6,211,814 B1 | 4/2001 | Benjamin et al. | |
| 6,239,764 B1 | 5/2001 | Timofeev et al. | |
| 6,249,242 B1 | 6/2001 | Sekine et al. | |
| 6,281,833 B1 | 8/2001 | Pringle et al. | |
| 6,329,929 B1 | 12/2001 | Weijand et al. | |
| 6,342,866 B1 | 1/2002 | Ho et al. | |
| 6,345,099 B1 * | 2/2002 | Alvarez | 380/203 |
| 6,433,720 B1 | 8/2002 | Libove et al. | |
| 6,501,413 B2 * | 12/2002 | Annan et al. | 342/22 |
| 6,538,614 B2 | 3/2003 | Fleming et al. | |
| 6,580,304 B1 | 6/2003 | Rieven | |
| 6,650,661 B1 | 11/2003 | Buchanan et al. | |
| 6,657,577 B1 | 12/2003 | Gregersen et al. | |
| 6,680,634 B1 | 1/2004 | Ruha et al. | |
| 6,690,741 B1 | 2/2004 | Larrick, Jr. et al. | |
| 6,694,273 B2 | 2/2004 | Kurooka et al. | |
| 6,726,146 B2 | 4/2004 | Li et al. | |
| 6,778,000 B2 | 8/2004 | Lee et al. | |
| 6,798,258 B2 | 9/2004 | Rieven | |
| 6,836,239 B2 | 12/2004 | Scott | |
| 6,845,458 B2 | 1/2005 | Lin | |
| 6,845,459 B2 | 1/2005 | Lin | |
| 6,853,227 B2 | 2/2005 | Laletin | |
| 6,853,338 B2 | 2/2005 | McConnell | |
| 6,864,833 B2 | 3/2005 | Lyon | |
| 6,868,504 B1 | 3/2005 | Lin | |
| 6,885,343 B2 | 4/2005 | Roper | |
| 6,912,666 B2 | 6/2005 | Lin | |
| 6,914,468 B2 | 7/2005 | Van Dijk et al. | |
| 6,930,528 B2 | 8/2005 | Ajit | |
| 6,956,422 B2 | 10/2005 | Reilly et al. | |
| 7,020,794 B2 | 3/2006 | Lin | |
| 7,026,850 B2 | 4/2006 | Atyunin et al. | |
| 7,026,979 B2 | 4/2006 | Khosla | |
| 7,037,266 B2 | 5/2006 | Ferek-Petric et al. | |
| 7,042,385 B1 | 5/2006 | Wichmann | |
| 7,053,814 B2 | 5/2006 | Yap | |
| 7,157,952 B2 | 1/2007 | Avants et al. | |
| 7,161,531 B1 | 1/2007 | Beazell | |
| 7,203,600 B2 | 4/2007 | Keers et al. | |
| 2002/0000946 A1 | 1/2002 | Portin | |
| 2003/0043078 A1 | 3/2003 | Deng et al. | |
| 2003/0179025 A1 | 9/2003 | Partsch et al. | |
| 2004/0036655 A1 | 2/2004 | Sainati et al. | |
| 2004/0090373 A1 | 5/2004 | Faraone et al. | |
| 2004/0111650 A1 | 6/2004 | Chen | |
| 2004/0178838 A1 | 9/2004 | Ngo et al. | |
| 2005/0200549 A1 | 9/2005 | Thompson et al. | |
| 2005/0237260 A1 | 10/2005 | Bancroft | |
| 2005/0286320 A1 | 12/2005 | Iwasaki | |
| 2006/0038598 A1 | 2/2006 | Reilly et al. | |
| 2006/0038599 A1 | 2/2006 | Avants et al. | |
| 2006/0087471 A1 | 4/2006 | Hintz | |
| 2006/0119407 A1 | 6/2006 | Abrosimov | |
| 2006/0132210 A1 | 6/2006 | Kong et al. | |
| 2006/0203613 A1 | 9/2006 | Thomsen et al. | |
| 2006/0256025 A1 | 11/2006 | Askildsen | |
| 2007/0080864 A1 | 4/2007 | Channabasappa | |
| 2008/0001808 A1 | 1/2008 | Passarelli et al. | |
| 2010/0066585 A1 | 3/2010 | Hibbard et al. | |
| 2010/0237871 A1 | 9/2010 | Allouche | |

OTHER PUBLICATIONS

Office Action issued in U.S. Appl. No. 11/754,152, mailed Oct. 21, 2008.

International Search Report issued in International Application No. PCT/US2008/72303, mailed Oct. 22, 2008.

Written Opinion issued in International Application No. PCT/US2008/72303, mailed Oct. 22, 2008.

Daniels, Jeffrey J. et al., "Ground Penetrating Radar for Imaging Archeological Objects," Proceedings of the New Millennium International Forum on Conservation of Cultural Property, Dec. 5-8, 2000, pp. 247-265, edited by Suckwon Choi and Mancheol Suh, Institute of Conservation Science for Cultural Heritage, Kongju National University, Kongju, Korea.

Kinlaw, Alton E., et al., "Use of Ground Penetrating Radar to Image Burrows of the Gopher Tortoise (*Gopherus polyphemus*)," Herpetological Review, 2007, pp. 50-56, vol. 38, No. 1, Society for the Study of Amphibians and Reptiles.

"Energy Focusing Ground Penetrating Radar (EFGPR) Overview," Jan. 28, 2003, pp. 1-12, Geo-Centers, Inc.

Kim et al., Design and Realization of a Discretely Loaded Resistive Vee Dipole on a Printed Circuit Board, 2003, pp. 818-829, vol. 5089, Proceedings of SPIE.

Montoya et al., Land Mine Detection Using a Ground-Penetrating Radar Based on Resistively Loaded Vee Dipoles, Dec. 1999, pp. 1795-1806, vol. 47, No. 12, IEEE Transactions on Antennas and Propagation.

Whiteley, et al., 50 GHz Sampler Hybrid Utilizing a Small Shockline and an Internal SRD, 1991, pp. 895-898, IEEE Microwave Theory & Technique-S Digest.

Tek Sampling Oscilloscopes Technique Primer 47W-7209, Oct. 2989, pp. 1-4, Tektronix, Inc.

Office Action issued in related U.S. Appl. No. 11/260,038 mailed Oct. 17, 2007.

Office Action issued in related U.S. Appl. No. 11/260,038 mailed Mar. 17, 2007.

Office Action issued in related U.S. Appl. No. 11/260,038 mailed Aug. 6, 2008.

International Search Report issued in Application No. PCT/US2008/064541 mailed Nov. 4, 2008.

Written Opinion issued in Application No. PCT/US2008/064541 mialed Nov. 4, 2008.

International Search Report issued in Application No. PCT/US2008/072543 mailed Nov. 4, 2008.

Written Opinion issued in Application No. PCT/US2008/072543 mailed Nov. 4, 2008.

Office Action issued in U.S. Appl. No. 11/292,433 mailed Nov. 24, 2008.

Office Action issued in U.S. Appl. No. 11/754,127 mailed Feb. 26, 2009.

Office Action issued in U.S. Appl. No. 09/273,461 mailed Jan. 21, 2000.

Office Action issued in U.S. Appl. No. 09/273,461 mailed Jul. 6, 2000.

Apr. 20, 2000 Response to Office Action issued Jan. 21, 2000. U.S. Appl. No. 09/273,461.

(56) References Cited

OTHER PUBLICATIONS

Final Office Action issue in U.S. Appl. No. 11/754,152 mailed Apr. 24, 2009.
Office Action issued in related U.S. Appl. No. 11/292,433, mailed Feb. 16, 2010.
Supplemental Notice of Allowability issued in U.S. Appl. No. 11/754,152 on Dec. 4, 2009.
International Preliminary Report on Patentability issued in Application No. PCT/US2008/064541 on Dec. 1, 2009.
International Preliminary Report on Patentability issued in Application No. PCT/US2008/064552 on Dec. 1, 2009.
Notice of Allowance issued in U.S. Appl. No. 11/852,030 on Dec. 4, 2009.
Final Office Action issue in U.S. Appl. No. 11/292,433 mailed May 12, 2009.
Notice of Allowance issued in U.S. Appl. No. 11/260,038 mailed May 29, 2009.
International Preliminary Report on Patentability issued in PCT/US2008/072303 on Mar. 18, 2010.
International Preliminary Report on Patentability issued in PCT/US2008/072543 on Apr. 1, 2010.
File History of U.S. Appl. No. 11/292,433.
File History of U.S. Appl. No. 11/754,127.
File History of U.S. Appl. No. 11/754,152.
File History of U.S. Appl. No. 11/260,038.
Response to Office Action issued in U.S. Appl. No. 11/292,433, filed Jun. 26, 2009.
International Search Report issued in PCT/US08/064552 on Jul. 7, 2009.
Written Opinion issued in PCT/US08/064552 on Jul. 7, 2009.
Press et al., "Numerical Recipes in C: The Art of Scientific Computing—2nd", Cambridge University Press, Jan. 1, 1992.
Kim et al., "A Resistive Linear Antenna for Ground-Penetrating Radars", 2004, pp. 359-370, vol. 5415, proceedings of SPIE.
Kim et al., "Design of a Resistively Loaded Vee Dipole for Ultrawide-Band Ground-Penetrating Radar Applications", Aug. 2005, pp. 2525-2532, vol. 53, No. 8, IEE Transactions on Antennas and Propagation.
Kim et al., "Design and Realization of a Discretely Loaded Resistive Vee Dipole for Ground-Penetrating Radars", Jul. 2004, pp. 1-9, vol. 39, Radio Science.
Montoya, Thomas P., "Vee Dipole Antennas for use in Short-Pulse Ground-Penetrating Radars", Mar. 1998, Georgia Institute of Technology.
Notice of Allowance issued in U.S. Appl. No. 11/754,152 on Sep. 21, 2009.
Notice of Allowance issued in U.S. Appl. No. 11/260,038 on Sep. 25, 2009.
Notice of Allowance issued in U.S. Appl. No. 11/754,127 on Sep. 29, 2009.
Advisory Action issued in U.S. Appl. No. 11/292,433 on Jul. 7, 2009.
RCE filed in U.S. Appl. No. 11/292,433 on Nov. 10, 2009.
Final Office Action issued in U.S. Appl. No. 11/260,038 dated Feb. 5, 2009.
Examination report issued in AU 2008256841 on Feb. 7, 2011.
File History of U.S. Appl. No. 11/857,840.
File History of U.S. Appl. No. 11/852,030.
European Patent Office Communication Pursuant to Article 94(3) in corresponding European Application No. 08 795 861.7 (Mar. 2, 2011) (5 pages total).
Amendment to claims and remarks dated Aug. 25, 2011 in corresponding European Application No. 08 795 861.7 (15 pages total).
European Patent Office Communication Pursuant to Article 94(3) in corresponding European Application No. 08 795 861.7 (Aug. 16, 2012) (5 pages total).

* cited by examiner

SYSTEMS AND METHODS FOR PROVIDING TRIGGER TIMING

CROSS-REFERENCE TO RELATED APPLICATIONS

The present application is related to concurrently filed, co-pending, and commonly assigned U.S. patent application Ser. No. 11/754,127, filed May 27, 2007, entitled "SYSTEMS AND METHODS FOR PROVIDING DELAYED SIGNALS"; and U.S. patent application Ser. No. 11/754,152, filed May 27, 2007, entitled "SYSTEMS AND METHODS USING MULTIPLE DOWN-CONVERSION RATIOS IN ACQUISITION WINDOWS", the disclosures of which are hereby incorporated herein by reference.

TECHNICAL FIELD

The present description relates, in general, to signal processing and, more specifically, to systems and methods for providing timing for transmit and receive operations for signals.

BACKGROUND OF THE INVENTION

Equivalent time sampling is a process that allows a repetitive, high-speed signal to be sampled and held at a lower sample rate. For example, in an Equivalent Time (ET) sampling radar system, a Radio Frequency (RF) pulse is transmitted in a repetitive fashion. For each repetition of the transmit pulse, a window of the received signal is sampled. The sample window is moved in time so as to sample a later portion of the received waveform for each repetition. This constantly increasing delay between a transmit pulse and its sample window generally corresponds to increasing distance from the transmitter, or in the case of ground penetrating radar, increasing depth in the soil.

FIG. 1 is an illustration of wave 100 undergoing equivalent time sampling. The positive edge of transmit trigger pulse 101 causes a transmitter (not shown) to transmit a signal that returns to the receiver as wave 100. The negative edge of receive trigger pulse 102 causes a receive unit (not shown) to listen to wave 100, thereby sampling it and holding it for a very short time. Each subsequent negative edge of receive trigger pulse 102 is increasingly offset from its corresponding transmit trigger pulse 101 positive edge so that subsequent samples advance over the contour of a cycle of wave 100. Sample and hold output 103 is a reconstructed pulse of wave 100, stretched out in time.

In one example, the repetition rate of the transmit and receive triggers is about sixteen Megahertz (MHz), such that sixteen million samples are taken per second. If the sample and hold circuit has an aperture window of about ten picoseconds (ps), and if the delay between a transmit trigger edge and its corresponding receive trigger edge is incremented by ten picoseconds per repetition, then the real sample rate of sixteen Megahertz has an equivalent sample rate of one hundred gigahertz (GHz). However, the effective bandwidth may be limited to about ten gigahertz due to inaccuracies in the aperture window and edge inaccuracies (jitter) in transmit and receive trigger pulses 101 and 102.

Conventional ET sampling systems can be used with time domain radar to effect a time-stretch of the received radar signals, as shown in FIG. 1. For example, if each pulse cycle of wave 100 lasts ten nanoseconds, it may be down-converted by an equivalent time sampling approach and stretched to an equivalent shape in a ten millisecond period.

With ET sampling systems, when the pulse repetition rate is constant, the system often undersamples external energy sources. This external radiation is received as coherently sampled and down converted. As a result, prior art radar systems tend to have increased susceptibility to any frequency that shows up as any harmonic of the sample rate. Thus, the above-described radar system will generally be expected to have increased susceptibility to interference for any external energy that shows up as any multiple of sixteen Megahertz when it is sampled and down converted. FIG. 2 is a graph showing susceptibility versus frequency for such a system. The width of the spikes in FIG. 2 is usually related to the equivalent time bandwidth of the system. Thus, if the equivalent time bandwidth of the system is one Megahertz, the width of the spike will be two Megahertz due to mirroring around the Nyquist frequency.

Increased susceptibility is often a problem for radar systems, because designers of such systems usually design based at least in part on the "weakest link." Thus, relatively low susceptibility for some frequencies is usually irrelevant if there are large susceptibility spikes in other frequencies. One way that radar system designers mitigate the effects of increased susceptibility is to increase transmitter power so that more distant interference sources appear much weaker than the transmitted signal. However, this increases radiated emissions of the radar system.

Another kind of interference that is often seen by constant pulse repetition rate systems is interference from correlating frequencies-frequencies that are relatively close to the pulse repetition rate. A useful analogy to understand correlating frequencies involves the wheels of a car as seen on a movie screen. Often, the wheels of a car as seen on a movie screen appear to rotate slowly backward or forward. This is due to the relative rate of the wheels when compared to the rate of frame advance of the movie camera. If the wheels are rotating slightly slower that the rate of frame advance, the wheels will appear to rotate slowly backwards. Similarly, if the wheels are rotating slightly more quickly than the rate of frame advance, then the wheels will appear to rotate slowly forward. The same phenomenon occurs in ET sampling systems. An external fixed frequency that is close to the pulse repetition rate will be under sampled and aliased and will be down-converted to a coherent wave that interferes with the detection of the intended returned wave.

Yet another source of interference involved distant pulses from the radar system. Radar systems typically transmit a pulse and then turn on a receiver for a certain period of time in order to "listen" for any reflections occurring in that time range from nearby objects. However, in that same observation period, the radar system can also pick up reflections off of more distant objects for the prior transmit pulse, the transmit pulse preceding the prior pulse, etc. The more distant pulses are often interpreted as clutter. Constant sampling of such signals tends to make those signals appear coherent, such that they can cause a significant amount of interference.

Currently, there is no system available that minimizes interference from these and other sources without increasing radiated emissions or by significantly increasing the cost of the system (e.g., by using complex filtering techniques).

BRIEF SUMMARY OF THE INVENTION

The present invention is directed to systems and methods that provide pseudorandom phase variation in trigger signal pulses. Thus, various embodiments, rather than having a constant pulse repetition frequency, have a randomly-varying pulse repetition scheme.

When applied to ET sampling systems, such phase variations may significantly decrease a system's susceptibility to interference. For example, a radar system according to one embodiment of the present invention may sample the energy in the environment such that the pattern of the samples does not correlate to frequencies in the interference energy. Some embodiments may therefore have susceptibility that is evenly spread across a frequency spectrum.

Furthermore, some embodiments include components that that are minimally affected by the phase variations. Examples of such components include fixed delay sources in a clocking system that assist in providing variably-delayed clock signals. As a result, some embodiments provide consistent clocking performance across a spectrum of use.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 3:
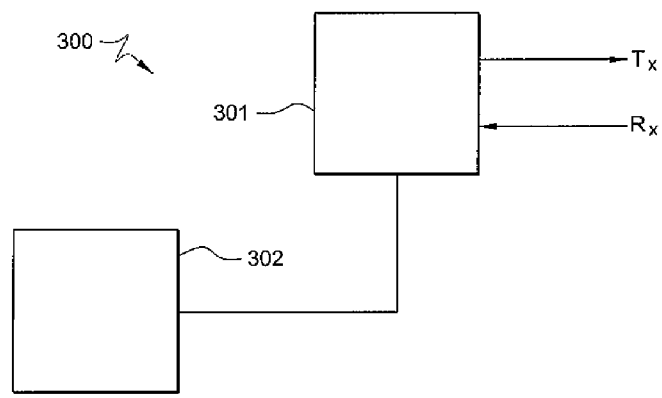
FIG. 3 is an illustration of an exemplary system adapted according to one embodiment of the invention.

FIG. 3 is an illustration of exemplary system 300 adapted according to one embodiment of the invention. System 300 may be any system that transmits a signal and samples a received signal, such as a radar system or an oscilloscope (receiver) in communication with a device under test (transmitter).

System 300 includes Equivalent Time (ET) sampling unit 301 that performs ET sampling on received signals. In radar system embodiments, ET sampling unit 301 may include Radio Frequency (RF) modules (e.g., transceivers) respectively connected to a transmit and a receive antenna element (not shown).

Further, system 300 includes control unit 302, which provides pseudorandom delay length variations between subsequent transmit/receive trigger pairs of unit 301. One example of a control unit is a semiconductor-based logic device (e.g., a general purpose processor, Application Specific Integrated Circuit, Field Programmable Gate Array, or the like) in communication with a delay unit (e.g., a programmable delay line), whereby the logic device determines a delay and controls the delay unit to provide the delay to a signal.

Components 301 and 302 are shown as separate elements in FIG. 3 to illustrate a conceptual difference between the functions performed. However, various embodiments of the invention are not limited thereto, as there is no requirement that units 301 and 302 be physically separate in all embodiments. Further, embodiments may be configured in a variety of ways, one if which is described in more detail with regard to FIG. 7.

Figure 4:
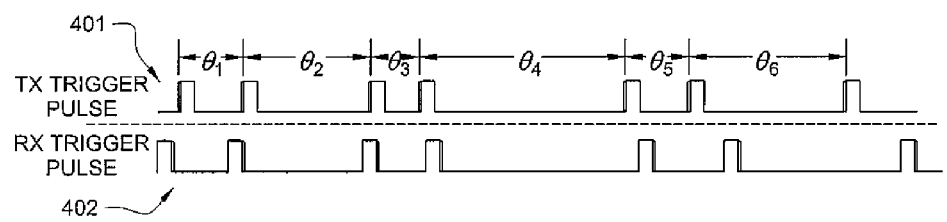
FIG. 4 is a timing diagram of an exemplary transmit/receive trigger pulse pattern according to one embodiment of the invention.

FIG. 4 is a timing diagram of an exemplary transmit/receive trigger pulse pattern according to one embodiment of the invention. In this example, signal 401 is a transmit trigger pulse, the rising edge of which causes a transmitter to send out a signal. Signal 402 is a receive trigger, the falling edge of which causes a receive unit to sample a received waveform.

Figure 1:
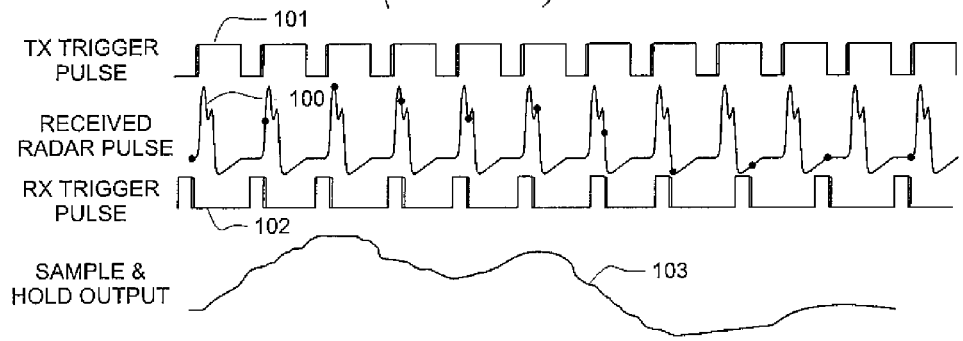
FIG. 1 is an illustration of a wave undergoing equivalent time sampling.

There are two delays illustrated in FIG. 4. First, there is a delay, relative to signal 401, that is applied to signal 402. This delay is also present in FIG. 1, and it facilitates ET sampling by allowing a system to sample different portions of a received waveform. Second, there is a pseudorandomly varying delay between each transmit/receive pulse pair, wherein a transmit/receive pulse pair is a transmit pulse and its corresponding receive pulse measured, in this example, between rising edges of signal 401. The varying delays are labeled in FIG. 4 with the character, $\theta$, since a delay can also be characterized generally as a phase shift relative to some reference. In many embodiments, the first delay can be increased or decreased at a given, desired rate (in this case, a linear increase), the second delay variation notwithstanding. As such, many embodiments perform ET sampling independently of the second delay.

It should be noted that various embodiments of the invention are not limited to the configuration of the timing diagram of FIG. 4. For example, in some embodiments, an increasing or decreasing delay, relative to signal 402, is applied to signal 401 thereby facilitating ET sampling. Further, various designs may use a negative or positive edge of a given signal, as desired.

Various embodiments of the present invention may include one or more advantages over prior art embodiments. For example, an embodiment according to FIG. 4 will typically produce fewer Radiated Emissions (RE), since the pseudorandom phase variation between pulse pairs can be expected to spread the frequencies of the system's pulses over a wider spectrum. By contrast, a prior art system, such as that associated with FIG. 1, will generally produce RE at a frequency defined by the pulse repetition rate (and harmonics thereof). Thus, a system associated with FIG. 4 generally causes less interference for surrounding devices.

Figure 2:
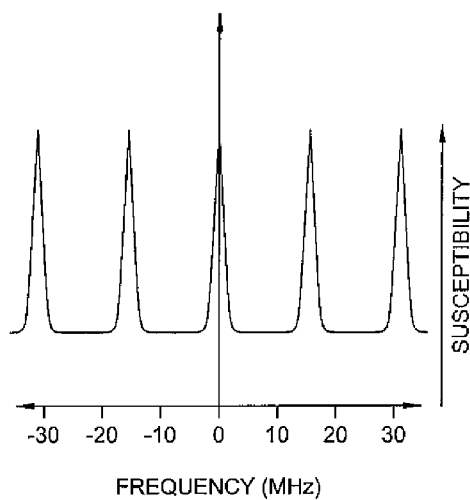
FIG. 2 is a graph showing susceptibility versus frequency for a prior art system.
Figure 5:
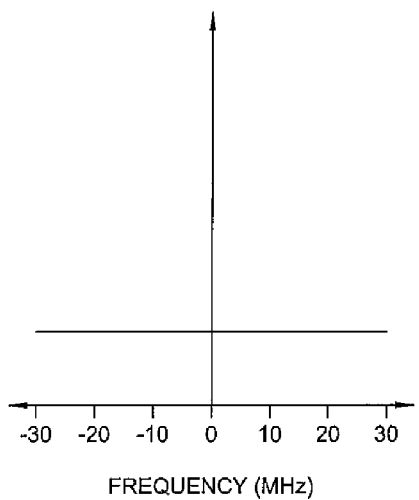
FIG. 5, which is a graph showing susceptibility versus frequency for a system according to one embodiment of the invention.

Further, various embodiments of the present invention may be less susceptible to interference from other sources and from past pulses because the interference energy will typically be seen as random energy or noise rather than as coherent signals. This is illustrated by FIG. 5, which is a graph showing susceptibility versus frequency for a system according to one embodiment of the invention. Whereas FIG. 2 shows spikes of susceptibility, FIG. 5 shows a relatively constant and low susceptibility for frequencies across the spectrum.

One way to conceptually model interference sources is to imagine a sphere around a radar system, where the sphere represents a distance from the radar system where a transmitting interference source of a particular power begins to cause detectable interference. In other words, if the interference source is outside the sphere, the radar system operates without interference, whereas if the source is within the sphere, the radar system experiences some interference. Various embodiments, by randomizing the phase variation and smoothing the susceptibility across the spectrum, shrink the sphere by a certain amount. The amount is related to the ratio of the equivalent time bandwidth to the Nyquist frequency. In one example, the sampling rate is sixteen Megahertz, and the equivalent time bandwidth is one Megahertz, such that the above-mentioned ratio is ⅛. Thus, the sphere would shrink by ⅛ or about 12.5%. Such advantages may allow a system according to one or more embodiments to use higher gain antennas, and/or operate closer to potential interference sources than prior art systems. Also, systems according to some embodiments generally cause less radiated emissions for the same transmit power.

Figure 6:
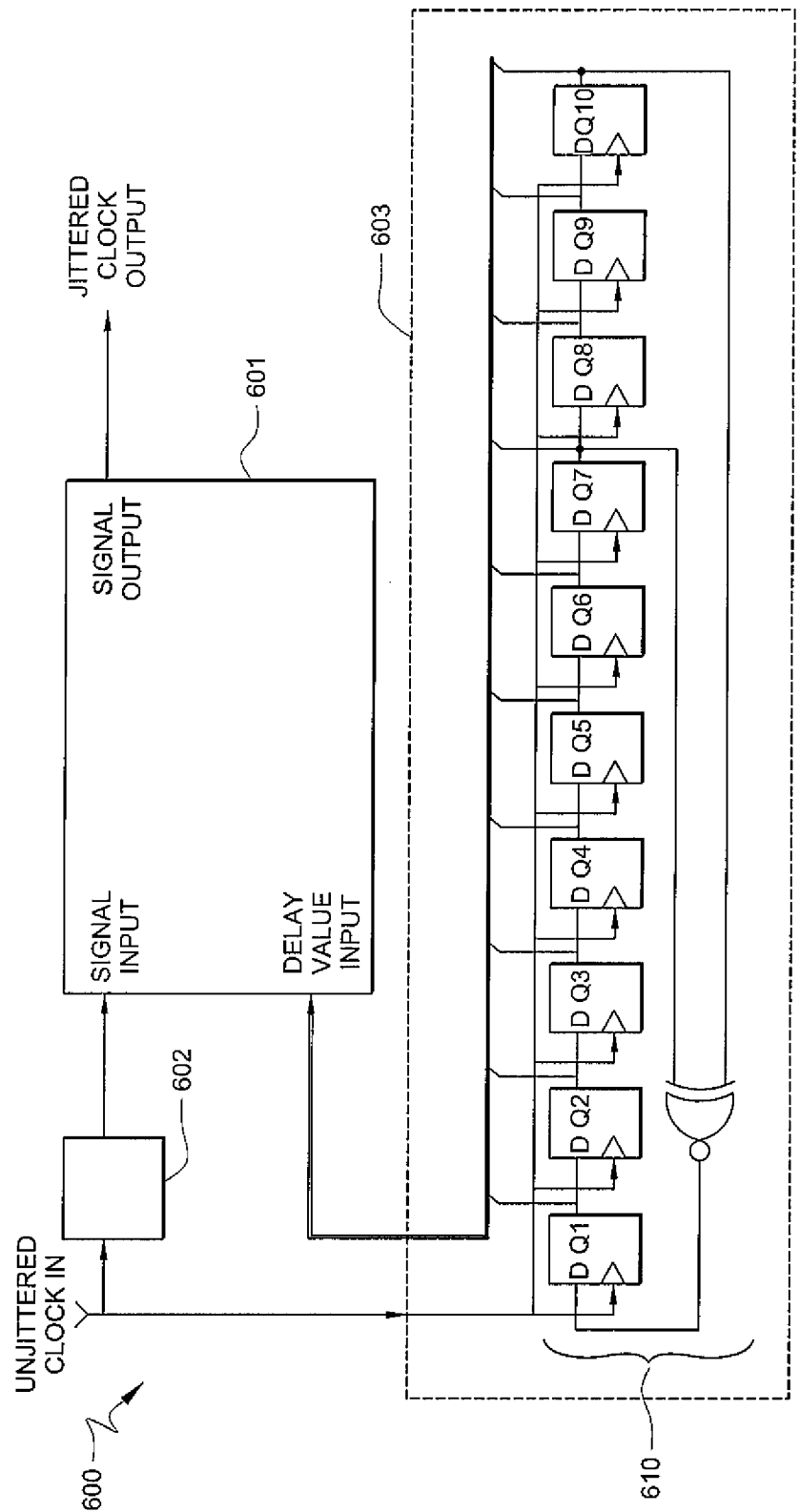
FIG. 6 is an illustration of an exemplary system adapted according to one embodiment of the present invention.

FIG. 6 is an illustration of exemplary system 600 adapted according to one embodiment of the present invention. System 600 can be used to provide a delayed clock, the variations in the delays being pseudorandom.

System 600 includes delay unit 601 that receives a clock signal input. Delay unit 601 may be any type of variable delay unit, such as a programmable delay line, model SY89296, available from MICREL®. In this example, the clock signal input is first processed by fixed delay 602 before it is fed to delay unit 601 in order to ensure that the delay value input changes while the unjittered clock in and jittered clock output are both low. Some embodiments may omit fixed delay 602, as desired.

System 600 also includes pseudorandom number generator 603, which in this example is a $2^{10}$-1 PseudoRandom Maximal Length Sequence (PRMLS) component. PRMLS components typically produce a flat and evenly distributed, pseudorandom sequence. Further, PRMLS components generally do not repeat a number until every number in the range is exhausted, thereby helping to ensure the even distribution of the spectrum. Various embodiments of the invention are not limited to a PRMLS component. For example, some embodiments may employ a number generator that produces an apparently random sequence but does not have a number sequence to exhaust. In fact, any number generator can be used that generates numbers in a substantially even distribution throughout a range and in such a pattern that a subsequent number cannot be determined by an outside observer by studying the previous numbers (the exception, of course, being a PRMLS component wherein an observer can determine the very last number in a sequence but no other numbers). Further, in this example, the length of the number sequence is chosen so that any detected coherent noise is outside of the bandwidth of the receive circuitry, which is often more closely related to the capabilities of the circuitry rather than to the sample rate. In one example, the bandwidth of the receive circuitry extends from fifty Megahertz to around ten Gigahertz, so the length of the sequence is chosen so that any detected coherent noise is below the fifty Megahertz cut-off.

Furthermore, in this example embodiment, random number generator 603 can be implemented as logic in an FPGA or other type of logic device. FIG. 6 shows various logic gates 610 used to output a ten-bit number from generator 603. Other logic (not shown) in generator 603 may be used to determine the sequence and to control gates 610 to output numbers according to the sequence.

Delay unit 601 receives the ten-bit number from number generator 603 and sets its delay in response thereto. The signal output from delay unit 601 is the clock signal delayed according to the output from number generator 603. Thus, the variation in the delays of the clock pulses is pseudorandom.

Figure 7:
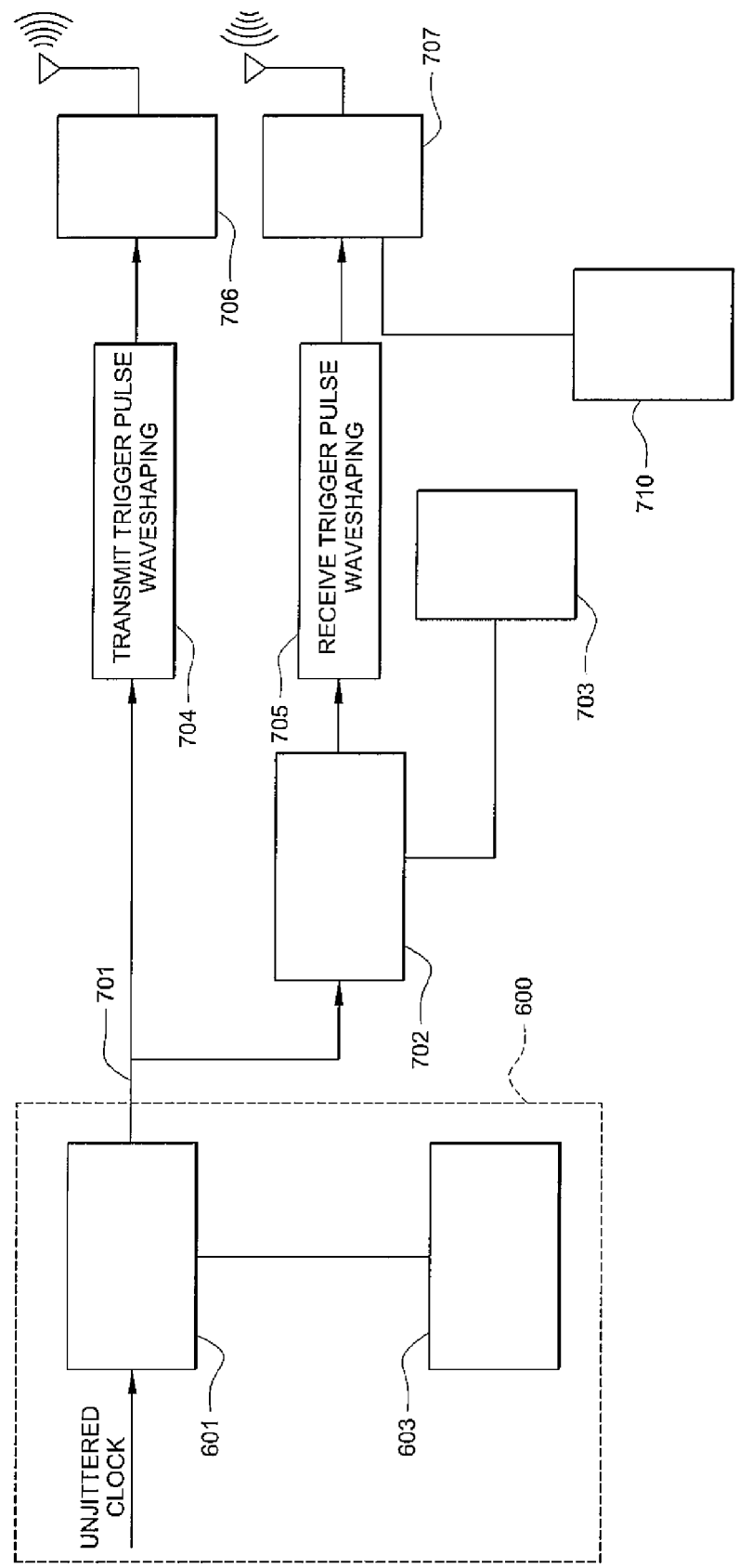
FIG. 7 is an illustration of an exemplary system adapted according to one embodiment of the invention.

FIG. 7 is an illustration of exemplary system 700 adapted according to one embodiment of the invention. System 700 is a radar system configured according to the principles of FIG. 1, with more detail shown.

System 700 includes system 600 (FIG. 6) producing pseudorandomly delayed clock signal 701. Clock signal 701 is fed to transmit trigger unit 704. On either the rising or falling edge of clock 701, transmit trigger unit 704 produces a trigger that is sent to transmit unit 706. In this example, the delay variation between subsequent transmit receive pairs is implemented by varying the delay between transmit triggers.

An additional delay is added to the trigger of receive trigger unit 705, the additional delay facilitating the progressive sampling of the returned wave with each subsequent receive trigger. The additional delay is added by delay unit 702 (which may be of the same type or of a different type as delay unit 601). Further, the additional delay is controlled by control unit 703, which may be, e.g., a logic device, such as an FPGA, ASIC, general-purpose processor, or the like.

Receive trigger unit 705 sends a trigger signal to receive unit 707. Receive units 706 and 707 in this example are RF transceivers with associated antenna elements. However, various embodiments are not limited to such a configuration, as other embodiments may combine units 706 and 707 into a single transmitting and receiving unit.

Receive unit 707 is in communication with radar logic unit 710. In this example, radar logic unit 710 receives the sampled portions of the wave and digitizes, stores, and reconstructs the wave. Radar logic unit 710 further analyzes the received wave using radar algorithms to, e.g., determine the presence of objects, determine the nature/type of objects, determine the location and/or speed of objects, and the like. Radar logic unit 710 then generates information, based on the above analysis, for presentation to a human operator. Radar logic unit 710 may include one or more processor-base devices and monitors, speakers, and/or other transducers to provide humanly-perceptible information.

Figure 8:
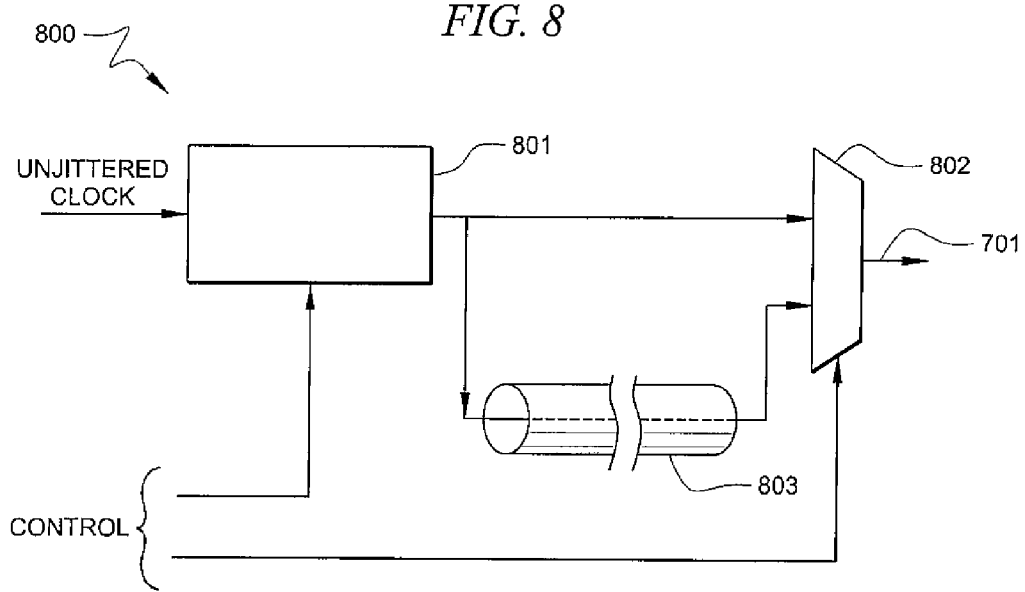
FIG. 8 is an illustration of an exemplary system adapted according to one embodiment of the invention.

FIG. 8 is an illustration of exemplary system 800 adapted according to one embodiment of the invention. System 800 is a delay unit that may be used in some embodiments in place of delay unit 601 (FIG. 6). System 800 includes variable delay component 801, which may be, e.g., a variable delay line, such as the MICREL® device mentioned above. Additionally, system 800 includes fixed delay component 803, which may be any kind of component capable of providing a fixed delay to a signal. For example, in one embodiment, component 803 is a coaxial cable that is cut to a length so that it provides a known, fixed, and precise delay when used for certain frequencies and under certain conditions.

Delay components 801 and 803 are used together in this embodiment so that component 801 acts a fine delay, and component 803 acts as a coarse delay. Multiplexor 802 has two inputs—the first input having delay only from component 801, and the second input having delay from both components 801 and 803. A system adapted according to this embodiment may have control input that includes a pseudorandom number given to component 801 and a pseudorandomly generated bit that controls multiplexor 802 to output one or the other input. Thus, system 800 can be used to produce clock signal 701 (FIG. 7). Such embodiments are described in U.S. patent application Ser. No. 11/754,127, issued as U.S. Pat. No. 7,649,492 entitled, "SYSTEMS AND METHODS PROVIDING DELAYED SIGNALS," filed concurrently herewith.

Embodiments adapted according to FIG. 8 may provide one or more advantages. For example, the performance of system 800 is somewhat unaffected by the pseudorandom variations in the delay. As a result, system 800 generally experiences less performance degradation than a system that relies solely on a semiconductor-based delay line to produce pseudorandom delays. This is especially true when system 800 is implemented with a coaxial cable as coarse delay component 803.

While system 800 is described as being an appropriate substitute for delay unit 601 (FIG. 6), it should be noted that system 800 has more general applicability. For example, any given delay unit, whether or not it is used to produce pseudorandom delays, is a possible candidate for substitution by system 800. For example, some embodiments of the present invention include system 800 as delay unit 702 (FIG. 7).

Figure 9:
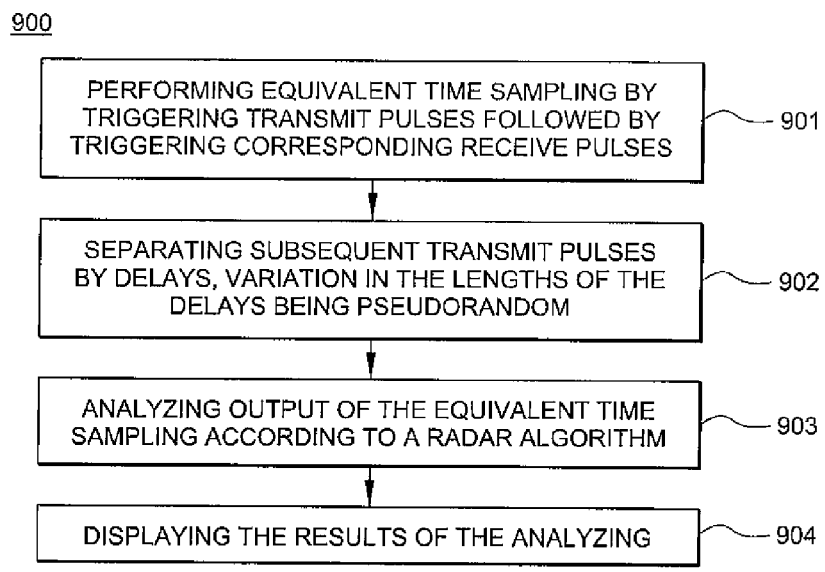
FIG. 9 is an illustration of an exemplary method adapted according to one embodiment of the invention.

FIG. 9 is an illustration of exemplary method 900 adapted according to one embodiment of the invention. Method 900 in many embodiments is performed by a radar system under the control of one or more processor-based devices to provide humanly-perceptible output about the presence and/or nature of objects that reflect/refract transmitted signals from the device. Further, various portions of method 900 may also be performed by systems that produce and sample waveforms (e.g., an oscilloscope and device under test, where the oscilloscope performs the sampling).

In block 901, ET sampling is performed by triggering transmit pulses followed by triggering corresponding receive pulses. In one example, a time offset between corresponding transmit and receive pulses is varied with each transmit/receive cycle so that a plurality of receive pulses sample a plurality of windows in a cycle of a received waveform. Then, the received waveform is reconstructed over a length of equivalent time.

It should be noted that various embodiments may be adapted for use in ET sampling systems that perform more than one sample of the received wave for each transmit pulse. Thus, in some examples, the action of block 901 includes triggering transmit pulses, each of the transmit pulses followed by a plurality of receive pulses.

In block 902, subsequent transmit pulses are separated by delays, wherein the variation in the lengths of the delays is pseudorandom. As a result of block 902, there is provided a pseudorandom phase variation between transmit/receive pairs. It should be noted that in this example, blocks 901 and 902 do not represent discrete steps that are performed in sequence. Rather, the action described by block 902 is performed as the action of block 901 is being performed.

Some embodiments utilize techniques other than separating subsequent transmit pulses, as in block 902, to provide pseudorandom phase variation between transmit and receive cycles. The action of block 902 is readily adaptable to an ET sampling system that generates receive triggers from a transmit trigger or clock, such that a relative offset between corresponding transmit and receive triggers is facilitated by varying a receive trigger delay (as in FIG. 7). By contrast, other embodiments (not shown) may generate transmit triggers from corresponding receive triggers, such that a relative offset between corresponding transmit and receive triggers is facilitated by varying a transmit trigger delay (not shown). In such embodiments, block 902 may include separating subsequent receive pulses by pseudorandomly varying phase delays.

The variation in the lengths of the delays may be provided by one or more techniques. For example, a pseudorandom number generator may be used to provide binary numbers to the input of a digitally variable delay. Additionally, some embodiments may include a fixed delay to use as a coarse delay, such that a switching component (e.g., a multiplexor) receives two signals—a first signal that is delayed by the variable delay, and a second component that is delayed by both the variable delay and the fixed delay. The switching component can then be controlled to output one or the other signal in a pseudorandom fashion. For instance, a switching bit can be generated either as a zero or as a one based on a pseudorandom algorithm.

In block 903, the output of the ET sampling is analyzed according to a radar algorithm. Thus, in one example, one or more reconstructed waveforms are processed by such algorithms. Radar algorithms are generally embodied as machine-readable code that is executed by a processor-based device. Example radar algorithms process a returned signal to determine the presence of an object, the position of an object, the speed of an object, the type of an object, and/or the like.

In block 904, the results of the analyzing are presented in a humanly perceptible form. For example, output may be given on a monitor, through speakers, and/or the like.

Other embodiments of the invention may add, delete, repeat, modify and/or rearrange various portions of method 900. For example, the actions of blocks 901-904 are generally repeated many times throughout the operation of a system, thereby providing continuously updated information to a user.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing trigger pulses for triggering transmit and receive pulses in a radar system, the system comprising:

an equivalent time sampling unit configured to provide transmit and receive trigger pairs, each trigger pair including a transmit trigger pulse and a corresponding receive trigger pulse, there being a varying delay between each transmit trigger pulse and the corresponding receive trigger pulse; and
a control unit comprising a pseudorandom number generator configured to generate a sequence of number values that produces a substantially even distribution of number values throughout a range, the control unit configured to control said equivalent time sampling unit to provide a sequence of pseudorandom delay periods, each pseudorandom delay period of said sequence of pseudorandom delay periods being between one of said trigger pairs and a next of said trigger pairs, each pseudorandom delay period of said sequence of pseudorandom delay periods being based on a pseudorandom number value of the sequence of number values, the varying delay between each transmit trigger pulse and the corresponding receive trigger pulse being adjustable independent of the sequence of pseudorandom delay periods;
wherein the system is configured to be included in a radar system having a receive circuitry bandwidth extending from fifty Megahertz to around ten Gigahertz such that each of the transmit trigger pulses causes a transmit pulse in the radar system and each of the corresponding receive trigger pulses causes a corresponding receive pulse in the radar system; and
wherein a length of the sequence of number values is chosen such that coherent noise is only detectable below fifty Megahertz.

2. The system of claim 1 wherein said equivalent time sampling unit includes a delay unit comprising:
a variable delay component;
a fixed delay component; and
a switching component configured to receive inputs from said fixed and variable delay components, said switching component configured to output one of said received inputs in response to signals from said control unit.

3. The system of claim 2 wherein said fixed delay unit comprises a length of coaxial cable with a known delay at a particular frequency.

4. The system of claim 2 wherein output from said fixed delay component comprises delay from both said variable delay component and said fixed delay component.

5. The system of claim 1 wherein successive transmit and receive pulse pairs have increasing offsets between corresponding transmit and receive pulses.

6. The system of claim 1 wherein said equivalent time sampling unit is configured to reconstruct a wave from samples taken of a received wave, said reconstructed wave stretched out over a time greater than one cycle of said received wave.

7. The system of claim 1 further comprising:
a Radio Frequency (RF) unit in communication with said equivalent time sampling unit to receive said trigger pairs, said RF unit configured to transmit radar pulses and configured to sample returned signals in response to said trigger pairs; and
a radar logic unit configured to receive said sampled returned signals and configured to analyze said sampled returned signals according to a radar algorithm, said radar logic unit further configured to provide humanly-perceptible output based upon said analyzing.

8. A method for producing and receiving signals in a radar system, said method comprising:
performing equivalent time sampling by triggering transmit pulses followed by triggering corresponding receive pulses, there being a varying delay between each of the transmit pulses and the corresponding receive pulses; and
separating subsequent transmit pulses by delay periods, variation in the lengths of said delay periods being pseudorandom and based upon a sequence of number values that produces a substantially even distribution of number values throughout a range, the delay between each of the transmit pulses and the corresponding receive pulses being adjustable independent of the pseudorandom delay periods;
wherein the method is performed by a radar system having a receive circuitry bandwidth extending from fifty Megahertz to around ten Gigahertz and transmitting and receiving electromagnetic waves over the air; and
wherein a length of the sequence of number values is chosen such that coherent noise is only detectable below fifty Megahertz.

9. The method of claim 8 wherein said performing equivalent time sampling comprises:
as time increases, increasing a time offset between corresponding transmit and receive pulses so that a plurality of receive pulses sample a plurality of windows in a cycle of a received waveform; and
reconstructing said received waveform stretched over a length of equivalent time.

10. The method of claim 8 wherein any given two consecutive transmit pulses are separated by a delay period generated by a process comprising:
generating a pseudorandom binary number;
inputting said pseudorandom binary number to a digital delay line, wherein said delay line produces a first delay based upon said pseudorandom binary number;
generating another binary number, said another binary number generated by a pseudorandom algorithm;
inputting said another binary number to a multiplexing unit, wherein said multiplexing unit receives a first signal from said digital delay line and a second signal from a fixed delay source;
outputting one of said first and second signals as a transmit trigger from said multiplexing unit, said outputting based on said another binary number; and
generating a transmit pulse in response to said transmit trigger.

11. The method of claim 10 wherein said fixed delay source is a coaxial cable portion cut to a length corresponding to a known delay.

12. The method of claim 8 wherein any given two consecutive transmit pulses are separated by a delay period generated by a process comprising:
generating a pseudorandom binary number;
inputting said pseudorandom binary number to a digital delay line, wherein said delay line produces a first delay based upon said pseudorandom binary number;
outputting a delayed signal from said digital delay line as a transmit trigger; and
generating a transmit pulse in response to said transmit trigger.

13. The method of claim 8 further comprising:
analyzing output of said equivalent time sampling according to a radar algorithm; and
displaying the results of said analyzing.

14. The method of claim 13 wherein said analyzing comprises:
determining one or more of the items in the list consisting of:
a position of an object;
a speed of an object;
a shape of an object;
and a type of an object.

15. A method for sampling a signal in a radar system, said method comprising:
- providing a series of transmit and receive pulse pairs, wherein a time offset between a transmit operation and a receive operation in a given pulse pair is varied from a previous pulse pair so that said series of pulse pairs samples a returned wave; and
- inserting delay periods between each said pulse pair and a next of said pulse pair, wherein variations in the delay periods between successive pulse pairs are pseudorandom and based upon a sequence of number values that produces a substantially even distribution of number values throughout a range, the time offset between the transmit operation and the receive operation in a given pulse pair being adjustable independent of the pseudorandom delay periods;
- wherein the receive pulse is sent to a radar system having a receive circuitry bandwidth extending from fifty Megahertz to around ten Gigahertz to cause the radar system to receive a signal; and
- wherein a length of the sequence of number values is chosen such that coherent noise is only detectable below fifty Megahertz.

16. The method of claim 15 wherein a given pulse pair comprises:
- a transmit pulse; and
- a first receive pulse following said transmit pulse.

17. The method of claim 15 wherein said providing a series of transmit and receive pulse pairs comprises:
- triggering receive pulses by delaying a transmit trigger signal.

18. The method of claim 15 wherein said providing a series of transmit and receive pulse pairs comprises:
- triggering transmit pulses by delaying a receive trigger signal.

19. The method of claim 15 wherein said inserting delay periods between each pulse pair comprises:
- inserting said delay periods between transmit pulses.

20. The method of claim 15 wherein said inserting delay periods between each pulse pair comprises:
- generating a pseudorandom number value;
- controlling a variable delay component to provide a first delay to a clock based on said generated pseudorandom number value, thereby producing a first delayed signal;
- providing a second delay to a clock by a fixed delay component, thereby providing a second delayed signal; and
- selectively outputting one of said first and second delayed signals to control a pulse.

21. The method of claim 20 wherein said controlled pulse is selected from the list consisting of:
- a transmit pulse; and
- a receive pulse.

22. The method of claim 20 wherein said fixed delay component is a portion of coaxial cable.

23. The method of claim 15 further comprising:
- analyzing said sampled returned wave according to a radar algorithm; and displaying results of said analyzing.

24. A radar system transmitting a signal and receiving a returned signal, said radar system comprising:
- means for performing equivalent time sampling on said returned signal by providing transmit and receive trigger pairs, each trigger pair including a transmit trigger pulse and a corresponding receive trigger pulse, there being a varying delay between each transmit trigger pulse and the corresponding receive trigger pulse; and
- means for varying a delay in a pulse repetition scheme of said equivalent time sampling means by inserting delay periods between each of said trigger pairs and a next trigger pair, wherein variations in the delay periods between successive trigger pairs are pseudorandom and based upon a sequence of number values that produces a substantially even distribution of number values throughout a range, the delay between each transmit trigger pulse and the corresponding receive trigger pulse being adjustable independent of the pseudorandom delay periods;
- wherein a receive circuitry of the radar system has a bandwidth extending from fifty Megahertz to around ten Gigahertz; and
- wherein a length of the sequence of number values is chosen such that coherent noise is only detectable below fifty Megahertz.

25. The radar system of claim 24 further comprising:
- means for analyzing results of said equivalent time sampling according to a radar algorithm; and
- means for displaying results of said analyzing.

26. The radar system of claim 24 wherein said delay varying means comprises:
- a variable delay component;
- a fixed delay component; and
- a switching component receiving inputs from said fixed and variable delay components, said switching component outputting one of said received inputs at a time, said switching component output triggering said pulse repetition.

27. The radar system of claim 26, wherein said fixed delay component comprises a length of coaxial cable.

* * * * *